ID Patent Office 3,098,733
Patented July 23, 1963

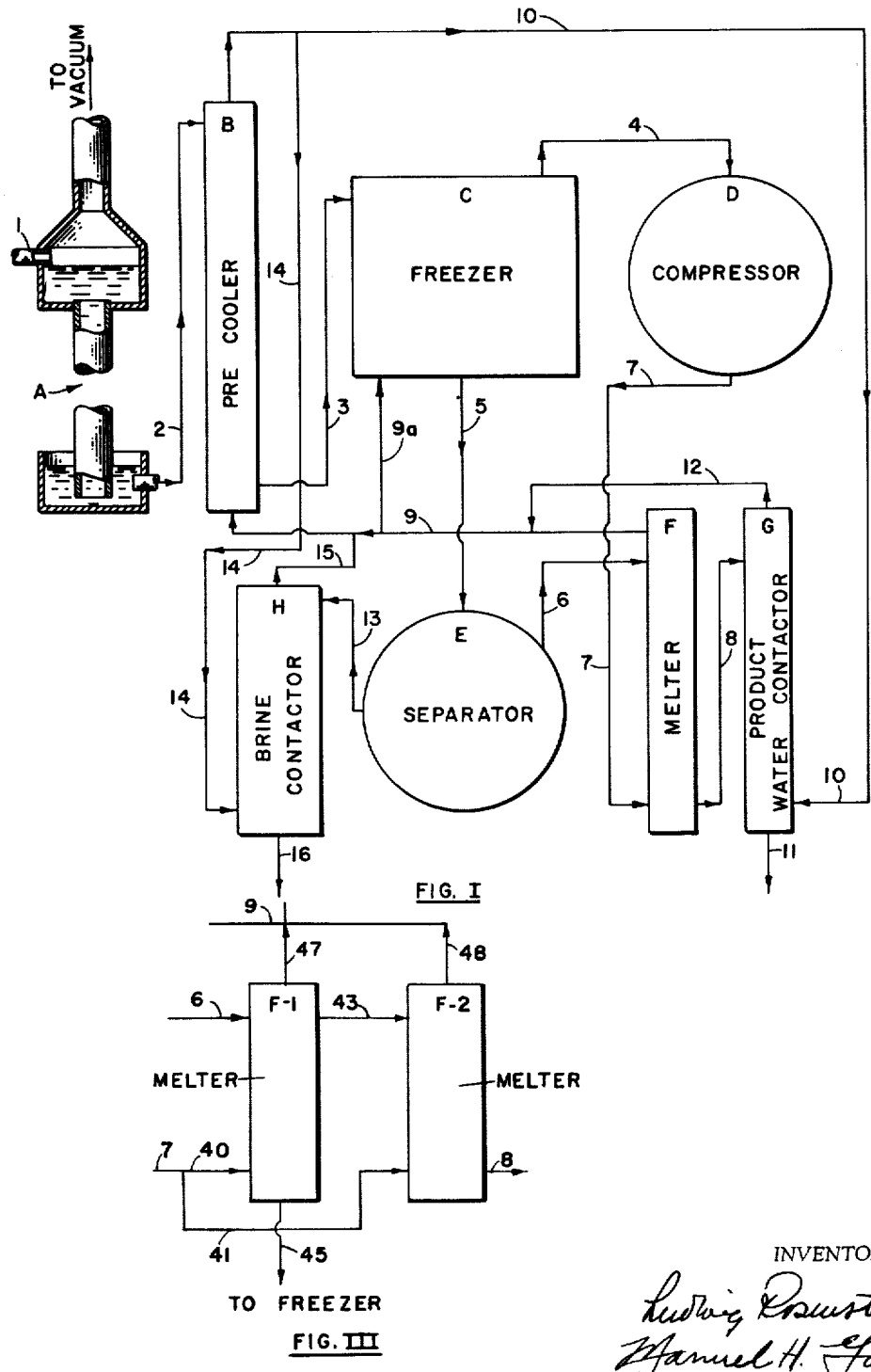

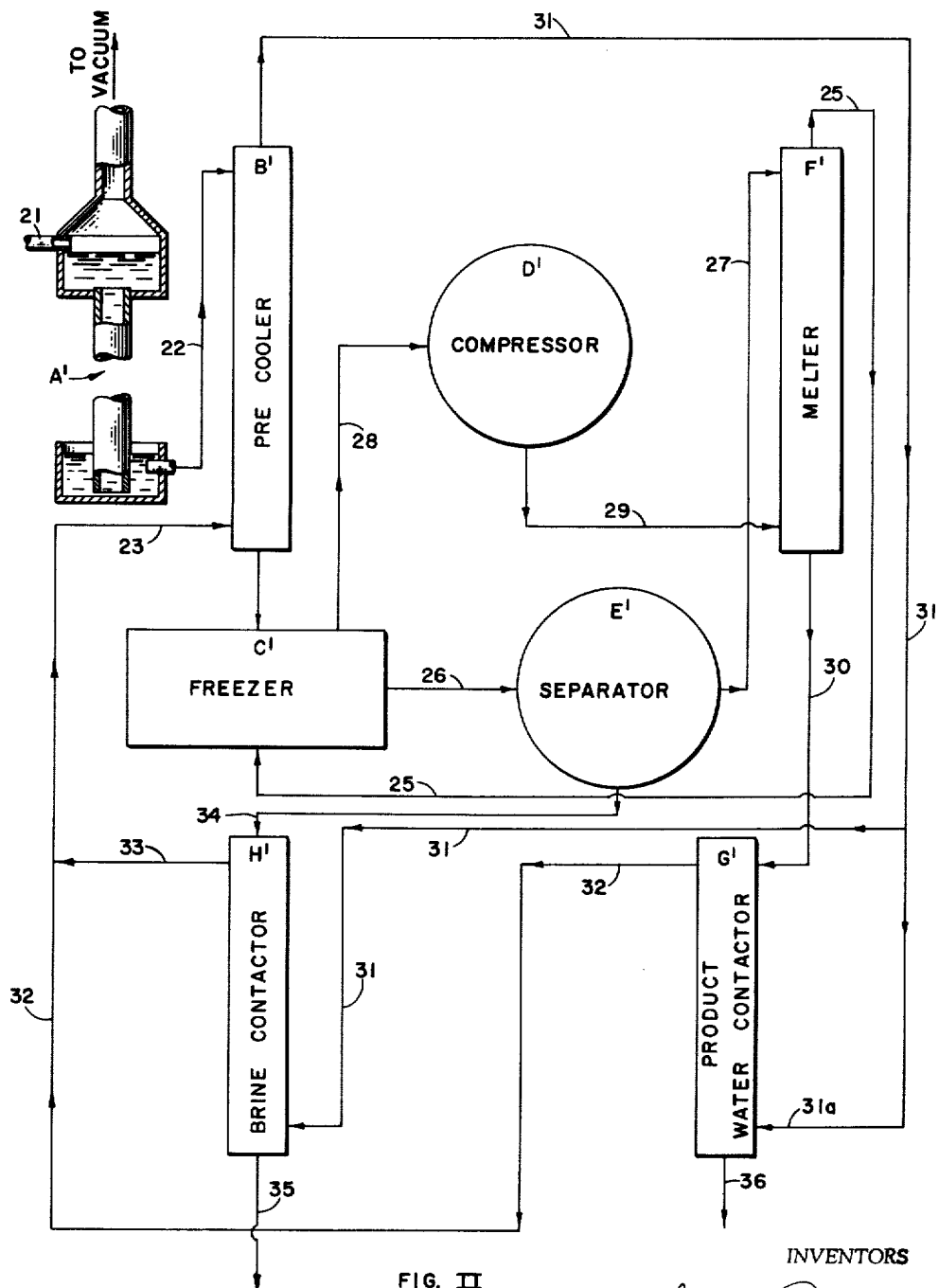
FIG. II
INVENTORS

3,098,733
REMOVAL OF WATER FROM AQUEOUS SOLUTIONS AND RECOVERY OF FRESH WATER
Ludwig Rosenstein, 2010 Lyon St., and Manuel H. Gorin, 1867 26th Ave., both of San Francisco, Calif.
Filed June 25, 1957, Ser. No. 668,284
17 Claims. (Cl. 62—58)

This invention relates to a process for the removal of water in the form of ice from dilute aqueous solutions and suspensions from which ice will be the solid phase to separate when heat is removed at the freezing temperature. The products which will results will be a more concentrated solution and fresh water. The process is characterized by a cycle of operations so devised that the expenditure of energy for the removal of a given amount of water will be a minimum. Other characteristics of the process and objects of the invention will become evident from the disclosure.

The process will be illustrated by its application to sea-water where a double objective is served: the recovery of usable fresh water and the production of brine of increased concentration which may be used for salt production by solar evaporation, etc.

The fact that sea-water or similar salines on freezing deposit ice of much lower salt content than the saline is well-known and has been widely discussed, but so far as known, this method of recovering usable water has not been put into large-scale practice. Freezing requires only about 15 percent the energy expenditure that is required by evaporation, yet the latter technique, in many different embodiments, appears to be the most widely applied. One reason for this appears to be that the freezing method, as generally understood, requires extensive temperature-transfer surfaces on which ice can form. As they become coated with ice they thereby become inefficient. This invention eliminates from the apparatus requirements all such temperature-transfer surfaces.

A further distinctive feature of this invention resides in its cycle of operation which is so devised that the materials leaving the cycle, that is the usable water and the brine, will be at approximately the same temperature as that of the saline entering the cycle.

To facilitate an understanding of the invention, reference is had to the accompanying drawing in which:

FIG. I is a flow sheet illustrating a system by which the process of this invention may be practiced, one element of the system, i.e. deaerator, being represented in vertical section;

FIG. II is a flow sheet schematically illustrating another system for the process of this invention, with the de-aerator thereof being represented in vertical section; and, FIG. III is a schematic illustration of a portion of still another system according to this invention representing a modification for a melter of the system.

Referring particularly to FIG. I, it illustrates the movements and interactions of the materials for the case where normal sea-water of approximately 3.4% total dissolved solids is the saline which enters the process at about 20° C., and that propane is both the refrigerating and temperature-exchanging medium. Sea-water entering by line 1 is de-aerated by passing through the barometric leg A (or similar device to remove dissolved oxygen and nitrogen) transfers through line 2 and enters the first cooler B at about 20° C., where it comes in direct contact with various streams (to be identified) of cold liquid propane and exchanges temperature therewith. The cooled sea-water, now at approximately 0° C. transfers through line 3 to vessel C, the freezer. Cold liquid propane from various sources (to be identified) enters the freezer through line 9a where it evaporates and cools the sea-water to form ice at about −2.1° C. average. The pressure in freezer C is maintained sufficiently below the vapor-pressure of the propane so that the latter evaporates at the required rate. Vessel C is connected by line 4 to the intake of the compressor D. The slurry of ice and brine leaves freezer C by line 5 and transfers to separator E wherein ice and brine are separated by centrifugal action, filtration or other physical means. The ice is transferred by path 6 to the melter F. Propane vapor which has been compressed by compressor D to a pressure such that it will liquify when cooled by the ice, enters F by line 7 from the compressor D. Two streams leave vessel F; cold water at about 0° C. leaves by line 8 and liquid propane at approximately 0° C. transfers by line 9 and becomes part of the cold liquid propane entering the pre-cooler B. The cold water leaving melter F by line 8 transfers to contactor G where it exchanges temperature directly with liquid propane at about 20° C. which has come from the top of pre-cooler B by line 10. Two streams leave contactor G. The water which is now at approximately 20° C. leaves by line 11 to storage or use; the liquid propane which is now at approximately 0° C. transfers through line 12 and becomes part of the cold liquid propane entering pre-cooler B. The cold brine at approximately −2.1° C. which has been separated from ice in separator E transfers by line 13 to contactor H wherein it exchanges heat with warm liquid propane coming from pre-cooler B through line 14. Two streams leave contactor H. From the top cold liquid propane transfers through line 15 and becomes part of the cold liquid propane entering pre-cooler B through line 9. Residual brine which is now at approximately 20° C. leaves the system by line 16 to be run to waste or other use.

All details such as pumps where required, valves, etc., etc., have been omitted as non-essential to an understanding of this invention.

FIG. II illustrates the process of this invention for the case where two different immiscible liquids are used instead of one; the one liquid having a high vapor-pressure and functioning mainly to form ice and to melt ice, and the second immiscible liquid serving solely as a temperature-exchange medium. In FIG. II de-aerated sea-water at about 20° C. has emerged from barometric-leg A' and transfers through line 22 to the first cooler B' where it meets kerosene at about 0° C. entering through line 23. The sea-water is cooled to approximately 0° C. and transfers through line 24 to freezer C' where it meets liquid propane at about 0° C. entering freezer C' through line 25. The pressure in freezer C' is maintained below the vapor-pressure of propane so that the latter evaporates and thereby causes part of the water in the sea-water to freeze. In this example 50% of the water is converted to ice so that a temperature of about −3.7° C. must be maintained in the freezer. The slush of ice and residual brine transfers through line 26 to separating device E' which separates the ice from the brine. The ice transfers through line 27 (a screw-conveyor or the like) to melter F' where it encounters propane vapor which has emerged from freezer C' and transferred through line 28 to compressor D' and thence through line 29 to melter F'. The pressure maintained in F' will be such that the propane vapor in contact with ice will condense to liquid propane. The cold liquid propane produced in F' transfers through line 25 to the freezer and thus completes its cycle. The cold-water leaving melter F' transfers by line 30 to vessel G' where it meets part of the warm kerosene which has issued from cooler B' and transferred through line 31 and 31a. Cold kerosene issues from vessel G' and transfers through lines 32 and 33 to the cooler B', thus completing its cycle. The cold brine which has emerged from separator E' transfers through line 34 to vessel H' where it meets the other part of warm kerosene which has transferred from cooler B through line 11. In vessel H the warm kerosene transfers heat to the cold brine and the cooled kerosene leaves vessel H' through line 33 to cooler B', thus completing its cycle. Concentrated brine at about 20° C. leaves vessel H' and is run to waste or other use through line 25. Product water leaves vessel G' at about 20° C. through line 26 to storage and use.

Both illustrative examples disclose the following features:

I. A cycle of direct temperature exchanges has been set up such that sea-water enters at 20° C. while the water and residual brine leave at approximately 20° C.

II. Propane has evaporated in direct contact with sea-water and absorbed its heat of evaporation from the sea-water, thereby causing separation of ice, and formation of propane vapor. The latter, after compression, has given up its latent heat directly to the ice, causing it to melt and itself condensing to liquid propane ready to repeat the cycle.

III. All heat exchanges have taken place by direct countercurrent contacts of immiscible liquids and direct-contact between vapor with solid. All physical barriers have been eliminated so that heat exchanges are all extremely rapid and complete.

IV. The production of water has taken place with high energy efficiency and the major energy requirement has been supplied by a compressor for propane vapor. To indicate the small amount of this energy requirement the following example is cited:

In FIG. II where about 50% of water is removed from sea-water, the temperature in freezer C' is about −3.7° C. At this temperature the vapor-pressure of propane is 4.35 atm., while in melter F' the temperature is 0° C. at which the vapor-pressure of propane is 5.2 atmospheres. Theoretically the compression ratio need be only 1:1.20. Actually the pressure in the freezer will be held somewhat below 4.35 atmospheres and in the melter somewhat above 5.2 atmospheres; but in any case the required compression will be small. (Minor amounts of power will be required for pumps, separators, etc.) It should be especially noted that high efficiency is attained in this process without recourse to complex multi-effects such as are used in distillation of sea-water.

In an operation such as is illustrated in FIGS. I and II nearly all the power has been used to transfer water from a body of saline to one of nearly pure water, and to concentrate the solids in the saline by an amount corresponding to the water removed. If such a process could be carried out ideally, that is with perfect insulation, frictionless transfers and 100% temperature-exchange efficiencies, the minimum work required, in other words the "free energy" as thermodynamically defined, can be easily calculated as the following example illustrates:

The free-energy of removal of 50% of the water from normal sea-water at 20° C. has been calculated to be 3.9 kwh. per 1000 gal. of water removed. In actual practice the energy required will probably be a number of times this theoretical minimum. Its exact amount depends on scale of operation and engineering skill in design. Assuming, as an illustrative example, that the actual energy consumption is five times the theoretical minimum, or about 19.5 kwh. per 1,000 gal. water, this energy may be supplied in many different forms, such as by electric motors, internal combustion motors such as diesel engines and gas turbines, steam engines whose steam is generated by fuel or solar energy. On large scale a cost of energy of 0.5¢ per kwh. or less is commonly achieved, and on this basis the efficiency assumption made, the cost of water will approximate 10.0¢ per 1,000 gal. Where fuel is used to generate energy the heat-content of exhaust gases, as for example from a steam plant or diesel engine, may be used to evaporate sea-water or the product water for further purification, thus further increasing efficiency and reducing cost.

The ice produced by freezing the water of a saline is not pure. It occludes residual brine in varying amounts depending on the extent and technique of freezing. In the illustrative example, FIG. II, where 50% of the water is recovered, this may be 3,000 to 5,000 parts per million. Such water is not usable. However, it is also well known that when such ice melts, the first portion to melt carries with it the larger portion of the occluded salt. Therefore, the melting devices F in FIG. I and F' in FIG. II shall not be considered only as single vessels, but each may be a number of such vessels in which fractionation by melting takes place. (Such a melting device of a plurality of units might, for example, take the form of screw-conveyors designed to operate under pressure.)

FIG. III shows two melting tanks, F–1 and F–2, for illustrating an arrangement of a plurality of melter units. The arrangement of FIG. III is hereinafter described as being a substitute for the melter F of the system shown in FIG. I. To facilitate reference to FIG. I, certain of the flow lines in FIG. III bear the same reference numerals, respectively, as are used in FIG. I to designate corresponding parts. Thus, for example, numeral 6 in FIG. III designates the flow line which in FIG. I leads from the separator E to the melter F. In FIG. III, line 6 enters the first melter F–1 to admit all of the ice crystals from the separator E. In FIG. III, flow line 7 from the compressor D (FIG. I) leads to two branch lines 40 and 41 for admitting propane vapor to the melters F–1 and F–2 respectively. A minor fraction of the ice melts in tank F–1 and the unmelted residual ice is transferred by line 43 to the second melter F–2. The water produced by the partial melting in the first melter F–1 is withdrawn by line 45. The water produced by the melting of ice in the second melter F–2 is withdrawn by line 8 leading to the product water contactor G (FIG. I). Liquid propane passes from melters F–1 and F–2 by branch lines 47 and 48, respectively, connected to line 9 which leads to the pre-cooler B in FIG. I. It is estimated that when 50% of the water is frozen out of sea-water, the melting of 10% of the ice will carry away enough salts to leave 90% of the ice usable. The water produced by the first melting may be used for some other purpose or it may be purified by other means such as distillation, deionization, etc. Since it will contain less total solids than sea-water, and will be cold, it may also be returned to the freezer C as represented in the FIG. III embodiment. Another means for improving the purity of the ice prior to melting comprises washing it with cold sea-water or with a minor part of the product water. Such washings will be returned to the process at the freezer or other convenient point. The ice produced by freezing 50% of the water out of sea-water will occlude a certain amount of brine with about 6.5% average total solids. Since sea-water contains only about 3.5% solids replacement of occluded brine by sea-water results in substantial purification.

While this invention has been described as operating with propane only in one example, and with propane and kerosene in the other, many other liquids immiscible with water may be chosen. Suitable liquids must be immiscible with water, non-toxic, stable, have a specific gravity different from that of water and solution. One of the liquids, in case two are used, must have a vapor pressure at 0° C. of at least one atmosphere, while the other liquid should preferably have a vapor pressure at the temperature of incoming saline considerably lower than the vapor pressure of water. As suitable liquids for refrigeration as well as temperature exchange, we mention ethane, ethylene, propane, propene, iso-butane, iso-butene, methyl chloride, di-chloro-di-fluoro methane. As suitable temperature exchange liquids, we mention naphtha, xylene, the blends of hydrocarbons known as "paint thinner", vegetable oils such as cotton seed oil, diethyl-di-butyl, or analogous phthalates, etc.

The mere mixing of two immiscible liquids which are at different temperatures results only in a certain average temperature common to both. To achieve high efficiency of true temperature-exchange it is essential that the flows of the two liquids be counter-current and that eddies and convections be avoided. The various pieces of equipment in which temperature-exchange takes place must be designed with these considerations in mind. Suitably designed packed towers would accomplish the purpose. In case immiscible liquid is used which is heavier than water then the directions of flow must be reversed; the heavier liquid entering at the top of the temperature-exchange columns and saline at the bottom, thus maintaining counter-current flow.

De-aeration of the entering saline is indicated because the introduction of the air dissolved in the saline could eventually lead to an explosive mixture with hydrocarbon vapors. Even with good de-aeration some non-condensible gases will enter the system and means for purging these must be provided.

Examples have been given wherein 20% and 50% of the water in normal sea-water is converted to ice in the freezing step. Lower and higher proportions of water may be frozen; the practical upper limit in the case of sea-water being the point at which "sodium sulfate decahydrate" begins to crystallize. For normal sea-water this takes place when about 80% of the water has been abstracted.

The amount of water recovered in any given case for most economical operation depends upon such factors as purity of water desired; cost of fuel or power; labor-cost, etc.

The flow-sheets and examples are intended to be illustrative and not as limitations of the invention.

As illustrated in its application to sea-water, the process will be particularly useful as a means for supplying fresh water to regions close to sea-water and remote from sufficient fresh-water. It may also be useful, because of its efficiency and economy of equipment to supply large vessels, such as airplane carriers, with fresh water.

The process can be applied to the removal of water from milk, fruit juices, wine and other such products of high water content. For such products it will have the great advantage of a low-temperature operation combined with power and equipment economy. The latter is achieved by direct-contact counter-current temperature exchanges combined with freezing of water by direct-contact evaporation of an immiscible liquid and further combined with the direct-contact condensation of the vapors of the immiscible liquid by direct contact with the ice which has been removed.

The term "immiscible liquid" will be used to designate a liquid which is immiscible with water, non-toxic, stable in contact with water, has a specific gravity different from water and dilute aqueous solutions.

Having thus described our invention, what we claim is:

1. A process for producing a second less concentrated solution from a first more concentrated solution which comprises:
    (1) cooling said first solution to near its freezing point by direct contact countercurrent heat exchange with an immiscible liquid,
    (2) vaporizing a vaporizable liquid refrigerant through contact thereof with said cooled first solution, thus forming (a) solids, (b) a third residual solution more concentrated than said first solution, and (c) refrigerant vapors,
    (3) separating said solids from said third solution,
    (4) compressing said refrigerant vapors formed in step (2),
    (5) contacting said solids with compressed refrigerant vapors formed in step (4) thus condensing said refrigerant vapors to a liquid and converting said solids to said second solution, and
    (6) cooling said immiscible liquid from step (1) by direct contact countercurrent heat exchange individually with said second solution resulting from step (5) and said third solution resulting from step (2), thus cooling said immiscible liquid for reuse in step (1).

2. A process for separating substantially demineralized water from an aqueous salt solution which comprises:
    (1) cooling said salt solution to near its freezing point by direct contact countercurrent heat exchange with an immiscible liquid,
    (2) vaporizing a vaporizable liquid refrigerant through contact thereof with said cooled salt solution, thus forming (a) ice, (b) a residual solution more concentrated than said salt solution, and (c) refrigerant vapors,
    (3) separating said ice from said residual salt solution formed in step (2),
    (4) compressing said refrigerant vapors formed in step (2),
    (5) contacting said ice with compressed refrigerant vapors formed in step (4), thus condensing said refrigerant vapors to a liquid and converting said ice to said demineralized water, and
    (6) cooling said immiscible liquid from step (1) by direct contact countercurrent heat exchange individually with said demineralized water resulting from step (5) and said residual solution resulting from step (2), thus cooling said immiscible liquid for reuse in step (1).

3. A process for separating substantially demineralized water from an aqueous salt solution which comprises:
    (1) cooling said salt solution to near its freezing point by direct contact countercurrent heat exchange with an immiscible liquid which has been cooled in step (6),
    (2) vaporizing a vaporizable liquid refrigerant through contact thereof with said cooled salt solution, thus forming (a) ice, (b) a residual solution more concentrated than said salt solution, and (c) refrigerant vapors,
    (3) separating said ice from said residual solution formed in step (2),
    (4) compressing said refrigerant vapors formed in step (2),
    (5) contacting said ice with compressed refrigerant vapors formed in step (4), thus condensing said refrigerant vapors to a liquid and converting said ice to said demineralized water, and
    (6) cooling said immiscible liquid from step (1) by direct contact countercurrent heat exchange individually with said demineralized water resulting from step (5) and said residual solution resulting from step (2), thus cooling said immiscible liquid, and
    (7) reusing said immiscible liquid in step (1).

4. The process of claim 1 wherein said first solution is a microbial suspension.

5. A process for separating substantially demineralized water and a residual brine from an aqueous salt solution of less concentration than said residual brine, which comprises:
    (1) cooling said salt solution to near its freezing point by direct contact countercurrent heat exchange with an immiscible liquid,
    (2) vaporizing a vaporizable liquid refrigerant through contact thereof with said cooled salt solution, thus forming (a) ice, (b) said residual brine, and (c) refrigerant vapors,
    (3) separating said ice from said residual brine formed in step (2),
    (4) washing said ice with an aqueous salt solution less concentrated than said residual brine,
    (5) compressing said refrigerant vapors formed in step (2),
    (6) contacting said ice from step (4) with compressed refrigerant vapors formed in step (5), thus condensing said refrigerant vapors to a liquid and converting said ice to said demineralized water, and (7) cooling said immiscible liquid from step (1) by direct contact countercurrent heat exchange individually with said demineralized water resulting from step (6) and said residual brine resulting from step (2), thus cooling said immiscible liquid for at least partial reuse in step (1).

6. A process for producing a second less concentrated solution and a third residual more concentrated solution from a first solution of intermediate concentration which comprises:
   (1) cooling said first solution to near its freezing point by direct contact countercurrent heat exchange with a first immiscible liquid,
   (2) vaporizing a second immiscible liquid comprising a vaporizable liquid refrigerant, through contact thereof with said cooled first solution, thus forming (a) solids, (b) said third residual more concentrated solution, and (c) refrigerant vapors,
   (3) separating said solids from said third solution,
   (4) compressing said refrigerant vapors formed in step (2),
   (5) contacting said solids with compressed refrigerant vapors formed in step (4), thus condensing said refrigerant vapors to said second immismible liquid and converting said solids to said second solution, and
   (6) cooling said first immiscible liquid from step (1) by direct contact countercurrent heat exchange individually with said second solution resulting from step (5) and said third solution resulting from step (2), thus cooling said first immiscible liquid for reuse in step (1).

7. A process for separating substantially demineralized water and residual brine from an aqueous salt solution or less concentration than said brine which comprises:
   (1) cooling said salt solution to near its freezing point by direct contact countercurrent heat exchange with a first immiscible liquid,
   (2) vaporizing a second immiscible liquid comprising a vaporizable liquid refrigerant, through contact thereof with said cooled salt solution, thus forming (a) ice, (b) said residual brine, and (c) refrigerant vapors,
   (3) separating said ice from said brine formed in step (2),
   (4) compressing said refrigerant vapors formed in step (2),
   (5) contacting said ice with compressed refrigerant vapors formed in step (4), thus condensing said refrigerant vapors to said second immiscible liquid and converting said ice to said demineralized water, and
   (6) cooling said first immiscible liquid from step (1) by direct contact countercurrent heat exchange individually with said demineralized water resulting from step (5) and said residual brine resulting from step (2), thus cooling said first immiscible liquid for reuse in step (1).

8. The process of claim 7 wherein said first immiscible liquid is selected from the class consisting of naphtha, zylene, blends of hydrocarbons, vegetable oils and alkyl phthalates, and said second immiscible liquid is selected from the class consisting of immiscible liquids having a vapor pressure of at least one atmosphere at 0° C.

9. A process for separating substantially demineralized water and a residual brine from an aqueous salt solution of less concentration than said brine which comprises:
   (1) cooling said salt solution to near its freezing point by direct contact countercurrent heat exchange with a liquid kerosene which has been cooled in step (6),
   (2) vaporizing a vaporizable liquid refrigerant comprising a butane, through contact thereof with said cooled salt solution, thus forming (a) ice, (b) said brine, and (c) butane refrigerant vapors,
   (3) separating said ice from said brine formed in step (2),
   (4) washing said ice with an aqueous salt solution less concentrated than said residual brine,
   (5) compressing said refrigerant vapors formed in step (2),
   (6) contacting said ice with compressed refrigerant vapors formed in step (5), thus condensing said refrigerant vapors to a liquid butane and converting said ice to said demineralized water, and
   (7) cooling said liquid kerosene from step (1) by direct contact countercurrent heat exchange individually with said demineralized water resulting from step (6) and said residual brine resulting from step (2), thus cooling said liquid kerosene, and
   (8) reusing said liquid kerosene in step (1).

10. A process for producing a second less concentrated solution and a third residual more concentrated solution from a first solution of intermediate concentration which comprises:
    (1) cooling said first solution to near its freezing point by direct contact countercurrent liquid to liquid heat exchange with a portion of an immiscible liquid, said liquid being vaporizable at a pressure lower than the pressure employed in step (1),
    (2) vaporizing a second portion of said liquid through contact thereof with said cooled first solution whereby said liquid is a vaporizable liquid refrigerant, thus forming (a) solids, (b) said third residual more concentrated solution, and (c) refrigerant vapors,
    (3) separating said solids from said third solution,
    (4) compressing said refrigerant vapors formed in step (2),
    (5) contacting said solids with compressed refrigerant vapors formed in step (4) thus condensing said refrigerant vapors to a liquid and converting said solids to said second solution, and
    (6) cooling said immiscible liquid from step (1) by direct contact countercurrent heat exchange individually with said second solution resulting from step (5) and said third solution resulting from step (2), thus cooling said immiscible liquid for at least partial reuse in step (1).

11. A process for separating substantially demineralized water from a dilute aqueous solution which comprises:
    (1) cooling said solution to near its freezing point by direct contact countercurrent liquid to liquid heat exchange with a portion of an immiscible liquid, said liquid being vaporizable at a pressure lower than employed in step (1),
    (2) vaporizing a second portion of said liquid through contact thereof with said cooled solution whereby said liquid is a vaporizable liquid refrigerant, thus forming (a) ice, (b) a residual solution more concentrated than said dilute solution, and (c) refrigerant vapors,
    (3) separating said ice from said residual solution formed in step (2),
    (4) compressing said refrigerant vapors formed in step (2),
    (5) contacting said ice with compressed refrigerant vapors formed in step (4), thus condensing said refrigerant vapors to said liquid for at least partial reuse in step (2) and converting said ice to said demineralized water, and
    (6) cooling said immiscible liquid from step (1) by direct contact countercurrent heat exchange individually with said demineralized water resulting from step (5) and said residual solution resulting from step (2), thus cooling said immiscible liquid for at least partial reuse in step (1).

12. The process of claim 11 wherein said immiscible liquid is selected from the class consisting of immiscible liquids having a vapor pressure of at least one atmosphere at 0° C.

13. The process of claim 12 wherein said immiscible liquid is a butane.

14. A process for separating substantially demineralized water from an aqueous salt solution which comprises:
   (1) cooling said salt solution to near its freezing point by direct contact countercurrent heat exchange with a liquid butane which has been cooled in step (6),
   (2) vaporizing a vaporizable liquid refrigerant comprising a butane, through contact thereof with said salt solution, thus forming (a) ice, (b) a residual solution more concentrated than said salt solution, and (c) butane refrigerant vapors,
   (3) separating said ice from said residual solution formed in step (2),
   (4) washing said ice with an aqueous salt solution less concentrated than said residual solution,
   (5) compressing said refrigerant vapors formed in step (2),
   (6) contacting said ice with compressed refrigerant vapors formed in step (5), thus condensing said refrigerant vapors to a liquid butane for at least partial reuse in step (2) and converting said ice to said demineralized water,
   (7) cooling said liquid butane from step (1) by direct contact countercurrent liquid to liquid heat exchange individually with said demineralized water resulting from step (6) and said residual solution resulting from step (2), thus cooling said liquid butane, and
   (8) reusing said liquid butane in step (1).

15. A process for producing a second less concentrated solution and a third more concentrated residual solution from a first solution of intermediate concentration which comprises:
   (1) cooling said first solution to near its freezing point by direct contact countercurrent heat exchange with an immiscible liquid,
   (2) vaporizing a vaporizable liquid refrigerant through contact thereof with said cooled first solution, thus forming (a) solids, (b) said third residual more concentrated solution, and (c) refrigerant vapors,
   (3) separating said solids from said third solution,
   (4) compressing said refrigerant vapors formed in step (2),
   (5) contacting said solids with compressed refrigerant vapors formed in step (4) thus condensing said refrigerant vapors to a liquid and converting said solids to said second solution, and
   (6) cooling said immiscible liquid from step (1) by direct contact countercurrent heat exchange with said third solution resulting from step (2) thus cooling said immiscible liquid for reuse in step (1).

16. A process for producing a second less concentrated solution and a third residual more concentrated solution from a first solution of intermediate concentration which comprises:
   (1) cooling said first solution to near its freezing point by direct contact countercurrent heat exchange with an immiscible liquid,
   (2) vaporizing a vaporizable liquid refrigerant through contact thereof with said cooled first solution, thus forming (a) solids, (b) said third residual more concentrated solution, and (c) refrigerant vapor,
   (3) separating said solids from said third solution,
   (4) compressing said refrigerant vapors formed in step (2),
   (5) contacting said solids with compressed refrigerant vapors formed in step (4) thus condensing said refrigerant vapors to a liquid and converting said solids to said second solution, and
   (6) cooling said immiscible liquid from step (1) by direct contact countercurrent heat exchange with said second solution resulting from step (5) thus cooling said immiscible liquid for reuse in step (1).

17. In a process for recovering a second less concentrated solution and a third more concentrated solution from a first solution of intermediate concentration which process comprises:
   (1) vaporizing a vaporizable liquid refrigerant through contact thereof with said first solution, thus forming (a) solids from said first solution, (b) said third solution, and (c) refrigerant vapor,
   (2) separating said solids from said third solution,
   (3) compressing said refrigerant vapors, and
   (4) contacting said solids with compressed refrigerant vapor, thus condensing said refrigerant vapors to a liquid and converting said solids to said second solution; the improvement which comprises providing a cyclic process for exchanging heat between said first solution and said second and third solutions by:
      (a) warming said second and third solutions individually by direct contact countercurrent liquid to liquid heat exchange with a relatively warm heat exchange medium, thus cooling said heat exchange medium to approximately the initial temperature of said second and third solutions,
      (b) cooling said first solution by direct contact countercurrent liquid to liquid heat exchange with said heat exchange medium which has been cooled in step (a), thus warming said heat exchange medium to approximately the initial temperature of said first solution for reuse in step (a),
   said heat exchange medium characterized in that it is a liquid immiscible with said first, second and third solutions.

References Cited in the file of this patent

UNITED STATES PATENTS

| | | |
|---|---|---|
| 1,755,810 | Carney | Apr. 22, 1930 |
| 1,991,384 | Field et al. | Feb. 19, 1935 |
| 2,666,304 | Ahrel | Jan. 19, 1954 |
| 2,683,178 | Findlay | July 6, 1954 |
| 2,749,094 | Lewis et al. | Jan. 5, 1956 |
| 2,764,488 | Slattery | Sept. 25, 1956 |
| 2,821,304 | Zarchin | Jan. 28, 1958 |
| 2,967,693 | Cunningham et al. | Jan. 10, 1961 |

FOREIGN PATENTS

| | | |
|---|---|---|
| 176,499 | Great Britain | Mar. 7, 1922 |
| 70,507 | Norway | June 3, 1946 |

OTHER REFERENCES

Gilliland: "Fresh Water for the Future," Industrial and Engineering Chemistry, volume 47, number 12, December 1955, pages 2410–2422.

Research and Development Progress Report No. 10 of the United States Department of the Interior, Office of Saline Water, August 1956, pages 84 and 95 through 101.

UNITED STATES PATENT OFFICE
CERTIFICATE OF CORRECTION

Patent No. 3,098,733

July 23, 1963

Ludwig Rosenstein et al.

It is hereby certified that error appears in the above numbered patent requiring correction and that the said Letters Patent should read as corrected below.

Column 1, line 13, for "results" read -- result --; column 3, line 2, for "B through line 11. In vessel H the" read -- B' through line 31. In vessel H' the --; column 6, line 14, strike out "salt"; column 7, line 24, for "immismible" read -- immiscible --; line 35, for "or" read -- of --.

Signed and sealed this 7th day of April 1964.

(SEAL)
Attest:
ERNEST W. SWIDER

Attesting Officer

EDWARD J. BRENNER

Commissioner of Patents